July 2, 1957  B. WATSON  2,797,493
FIVE POINT STAR DESCRIBING INSTRUMENT
Filed June 10, 1955
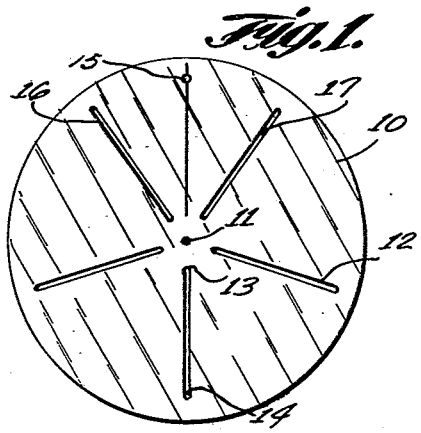
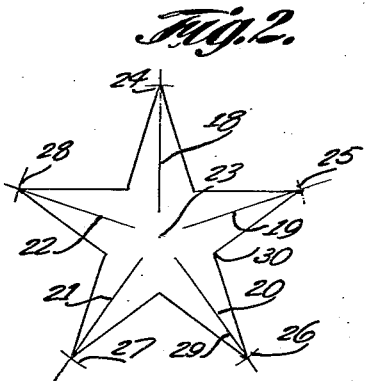
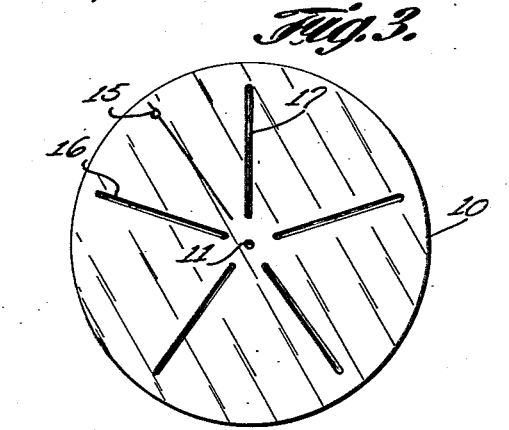
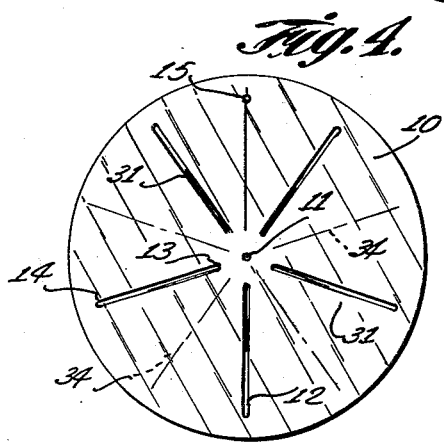
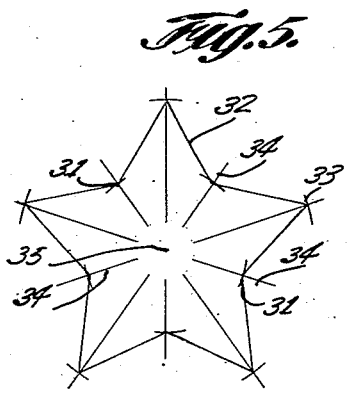
INVENTOR.
*Bert Watson*
BY *Victor J. Evans & Co.*
ATTORNEYS

# United States Patent Office 2,797,493
Patented July 2, 1957

2,797,493
FIVE POINT STAR DESCRIBING INSTRUMENT
Bert Watson, Philadelphia, Pa.

Application June 10, 1955, Serial No. 514,497

3 Claims. (Cl. 33—174)

This invention relates to drawing tools and instruments used for laying out designs, and in particular, a plate such as a template or stencil having five equally spaced radially disposed slots, a center opening, and also an opening spaced from the periphery and positioned midway between two of the slots extended therethrough, whereby with the disc positioned upon a sheet of material or object five radially disposed lines may be described and a dot placed in the center on the sheet of material, and with the device removed arcs intersecting the radially disposed lines may be described by a compass with the center thereof on the dot in the center of the design, and lines described through the intersections of the arcs and radially disposed lines define a five point star.

The purpose of this invention is to facilitate laying out a five point star.

Various types of devices have been provided for laying out five pointed stars, however, such devices require calculating the number of degrees between the points and, consequently, include a chance of error which is objectionable to the average layman. With this thought in mind, this invention contemplates a stencil or templet in which five equally spaced radially disposed slots definitely indicate positions of five points of a star and with lines described through the slots and intersected by arcs described with a compass an exact star may readily be described without the necessity of making calculations.

The object of this invention is, therefore, to provide an instrument with which a five point star may readily be described.

Another object of the invention is to provide a device for describing a five point star in which the device may be used for stars of different sizes.

A further object of the invention is to provide an instrument to facilitate laying out a five point star in which the instrument is of a simple and economical construction.

With these and other objects and advantages in view, the invention embodies a disc, such as a templet or stencil, having an opening in the center with equally spaced radially disposed slots extended from points spaced from the center to points spaced from the outer edge and also having a positioning opening midway between two of the slots and also spaced from the outer edge.

Other features and advantages of the invention will appear from the following description, taken in connection with the drawing, wherein:

Figure 1 is a plan view of the disc showing the relative positions of the parts.

Figure 2 is a view showing a five pointed star described by using the disc.

Figure 3 is a view showing the disc turned whereby the opening spaced from the outer edge is midway between two of the slots with one of the slots positioned on the point formerly occupied by the opening whereby lines may be described at points midway between the slots.

Figure 4 is a plan view of a sheet of material showing a combination of slots wherein the solid lines are formed with the disc in the position shown in Figure 1 and the broken lines with the disc in the position shown in Figure 3.

Figure 5 is a plan view of a five pointed star with the intermediate part of the star enlarged to provide advertising space or an area for a trade-mark or the like.

Referring now to the drawing, wherein like reference characters denote corresponding parts, the improved five point star describing instrument of this invention includes a disc 10 having a center opening 11 and equally spaced radially disposed slots 12 extended from points 13 spaced from the center opening 11 to points 14 spaced from the peripheral edge of the disc, and a positioning opening 15 located midway between slots 16 and 17 and also spaced from the peripheral edge of the disc.

With the parts as shown and described, the device is placed upon a plate or sheet of material with the opening 15 at the center of the top or at one side and with the opening 11 positioned in the center lines are described in the slots 12 providing marks 18, 19, 20, 21 and 22.

With the lines extended radially from a center point 23, the center of a compass is placed on the point 23 and with the compass set to a radius corresponding to the length of one of the points of a star short arcs 24, 25, 26, 27 and 28 are described on the lines 18, 19, 20, 21 and 22, respectively, and with a straight edge lines 29 are described between the points. With the lines 29 intersecting at points 30 midway between the lines of the points an accurate five point star is obtained.

Should it be desired to increase the center area of the star to provide space for advertising, a trade-mark, or the like, the radially disposed lines are described, as shown in Figure 2, and with the disc 10 rotated in a counter-clockwise direction until the slot 17 is positioned on a point formerly occupied by the opening 15 whereby the slots 12 are positioned midway between the lines of the points of the star and with lines described through the slots, as shown in Figure 4, short arcs, as indicated by the numeral 31, may be described across the lines positioned between the points, as shown in Figure 5, whereby with straight lines 32 described from points 33 to the intersections of the arcs 31 with intermediate lines 34 a star, as illustrated in Figure 5, will be obtained, the center portion of the star being enlarged to provide an area for advertising and the like. The center of the compass used for describing the arcs 31, in the design shown in Figure 5, is positioned on a center 35 of the star and it will be appreciated that by changing the radius indicated by the compass a star may be formed with a small or large center portion and by the same means the overall size of the star may be varied as desired. The lines forming the points, such as the lines 18, 19, 20, 21 and 22, may also be extended when stars of larger sizes are desired.

It will be understood that modifications, within the scope of the appended claims, may be made in the design and arrangement of the parts without departing from the spirit of the invention.

What is claimed is:

1. A drawing instrument comprising a disc having a center opening and equally spaced radially disposed slots extended from the center opening, the inner ends of the slots being spaced from the center opening and the outer ends spaced from the outer edge of the disc, said disc also having an opening positioned midway between two of the slots and spaced from the outer edge of the disc, and having a line extended from the opening spaced from the outer edge of the disc to a point spaced from the center opening of the disc.

2. A drawing instrument comprising a disc having a center opening and five equally spaced radially disposed slots extended from the center opening, the inner ends of the slots being spaced from the center opening and the outer ends spaced from the outer edge of the disc, said disc also having an opening positioned midway between two of the slots and spaced from the outer edge of the disc, and also having a line extended from the opening spaced from the outer edge of the disc to a point spaced from the center opening of the disc, said disc adapted to be used for describing radially disposed lines on a sheet of material with the lines extended from a point at the center and with lines described from points equally spaced from the center thereon to points of alternating lines the periphery of a five point star is described.

3. A drawing instrument comprising a disc having a center opening and equally spaced radially disposed slots extended from the center opening, the inner ends of the slots being spaced from the center opening and the outer ends spaced from the outer edge of the disc, said disc also having an opening positioned midway between two of the slots and spaced from the outer edge of the disc, and also having a line extended from the opening spaced from the outer edge of the disc to a point spaced from the center opening of the disc, said disc adapted to be used for describing lines locating points of a five point star on a sheet of material and also adapted to be turned on the center thereof through a distance equivalent to one-half of the distance between two of the lines to provide lines for points adapted to enlarge the center of a star formed by the instrument.

References Cited in the file of this patent

UNITED STATES PATENTS

| | | |
|---|---|---|
| 312,227 | Taft | Feb. 10, 1885 |
| 757,246 | Ablett | Apr. 12, 1904 |
| 1,369,470 | Rian | Feb. 22, 1921 |
| 2,229,757 | McEniry | Jan. 28, 1941 |
| 2,713,205 | Nielson | July 19, 1955 |